US007336180B2

(12) United States Patent
Sayegh et al.

(10) Patent No.: US 7,336,180 B2
(45) Date of Patent: Feb. 26, 2008

(54) ARTICLE SURVEILLANCE TAG HAVING A METAL CLIP

(76) Inventors: Adel O. Sayegh, 5143 Paddock Pl., Rancho Cucamonga, CA (US) 91737; Russell Abbott, 3333 Harrison St., Unit #6, Riverside, CA (US) 92503

( * ) Notice: Subject to any disclaimer, the term of this patent is extended or adjusted under 35 U.S.C. 154(b) by 25 days.

(21) Appl. No.: 11/483,076

(22) Filed: Jul. 7, 2006

(65) Prior Publication Data

US 2006/0250247 A1 Nov. 9, 2006

(51) Int. Cl.
*G08B 13/14* (2006.01)
*G08B 23/00* (2006.01)
*F16B 7/00* (2006.01)

(52) U.S. Cl. ................................ 340/572.1; 340/568.1; 340/568; 340/521; 340/572.8; 340/572.9; 24/704.1

(58) Field of Classification Search ..................... None
See application file for complete search history.

(56) References Cited

U.S. PATENT DOCUMENTS

| | | | | |
|---|---|---|---|---|
| 6,373,390 | B1 * | 4/2002 | Hogan et al. ............ | 340/572.8 |
| 7,023,348 | B2 * | 4/2006 | Hogan et al. ............ | 340/572.8 |
| 2004/0239505 | A1 * | 12/2004 | Hogan et al. ............ | 340/572.9 |
| 2005/0001726 | A1 * | 1/2005 | Valade et al. ............ | 340/572.9 |

* cited by examiner

*Primary Examiner*—Julie Lieu

(57) ABSTRACT

An electronic article surveillance (EAS) tag 20 having a metal attaching member 34 located therein and adapted to securely and releasably receive a shaft 52 of a pin therein, whereby a predetermined arcuate probe is inserted through an opening and applies a requisite force to the attaching member 34 to release the shaft 52. There are no channels leading the authorized arcuate probe to the attaching member 34. A plurality of partitions 58 and pillars 62 are interspersed within tag 20 to deflect any unauthorized probes from engaging and detaching attaching member 34.

6 Claims, 12 Drawing Sheets

ARTICLE SURVEILLANCE TAG HAVING A METAL CLIP

CROSS-REFERENCE TO RELATED APPLICATIONS

The contents of this application are related to United States non-provisional patent application having Ser. No. 10/410,486 filed on Apr. 3, 2003, which in turn claims priority to a provisional application having Ser. No. 60/371,063 filed on Apr. 8, 2002, the contents of which are incorporated herein by reference.

FIELD OF THE INVENTION

The invention relates to security tags in general, and in particular to a tag body containing an attaching means for use in electronic article surveillance (EAS) tags.

BACKGROUND OF THE INVENTION

Various types of electronic article surveillance (EAS) systems are known having the common feature of employing a marker or tag which is affixed to an article to be protected against theft, such as merchandise in a store. When a legitimate purchase of the article is made, the marker can either be removed from the article, or converted from an activated state to a deactivated state. Such systems employ a detection arrangement, commonly placed at all exits of a store, and if an activated marker passes through the detection system, it is detected by the detection system and an alarm is triggered.

For example, U.S. Pat. No. 5,426,419 to Nguyen et al., and assigned to Sensormatic Electronics Corporation, discloses an EAS tag having an arcuate channel that extends from an opening thereof to the actual attaching assembly and the detaching mechanism thereof. The channel increases the susceptibility of defeat of the attaching assembly because it guides an object that is inserted by an unauthorized individual directly to the attaching assembly and allows disengagement thereof.

U.S. Pat. No. 6,373,390 to Hogan et al., assigned to the same assignee as the '419 patent, is an improvement patent issued in light of the shortcomings of the '419 patent. The '390 patent admits that the EAS tag of the '419 patent "can be defeated by insertion of a segment of relatively rigid metal bent in an arcuate manner to simulate the arcuate probe of the associated detacher device." Furthermore, the '390 patent describes a fish tape which may be formed to resemble the requisite arcuate probe in order to defeat the EAS tag of the '419 patent, "the formed fish tape 50 is strong enough to hold its form when pushed into arcuate channel 7 until it can be manipulated into and against member 6, which then can be rotated to release tack assembly 4."

With respect to the '419 and '390 patent, many free standing arcuate probes have been either manufactured or misappropriated by unscrupulous individuals by dismantling the detacher components with which the probes are associated. The arcuate probe is inserted into the arcuate channel by hand and is lead directly to the preventing mechanism. In the '390 device, the arcuate channel leads the manipulated arcuate probe to the opening or slot located in the arcuate channel, wherein the opening further aligns and guides the hand manipulated probe directly to the preventing mechanism or member. In addition, the force required to release the preventing mechanism of the '419 and '390 device is less than the force required to release the preventing mechanism of the instant invention. Accordingly, an unscrupulous individual may easily defeat the preventing mechanism of the '419 and '390 devices by manipulating an illicitly acquired freestanding arcuate probe.

The '419 and '390 devices may be defeated by penetrating the bottom housing in proximal relation to the preventing mechanism and inserting a rigid and elongated element and forcing metal clip to rotate, whereby the preventing mechanism will release the pin. The instant device is more difficult to defeat in this manner.

In addition, the preventing mechanism of the '419 and '390 patents is attached on only one end thereof, thus allowing movement out of the horizontal plane. Consequently, the vertical movement of the clamp increases the susceptibility of defeat of the attaching assembly because the jaws expand more easily because the angle of the clamp varies between the first end and second end as a result of the vertical movement of the non-secure end. The pull force to disengage a pin from the instant device and the '419 device was conducted by using an Imada product model DPS220R, obtainable from 450 Skikie Blvd. #503, N. Brook, Ill. 60062.

The prior art does not address the need for an EAS tag that is difficult to defeat. In addition, the prior art fails to provide a clamp assembly that requires greater pull force to disengage a pin from the clamp assembly. Furthermore, the prior art fails to provide a tag that is more difficult to defeat even when an unscrupulous individual has illicitly acquired a freestanding arcuate probe. Therefore, there remains a long standing and continuing need for an advance in the art of EAS tags that is more difficult to defeat, is simpler in both design and use, is more economical, efficient in its construction and use, and provides a more secure engagement of the article.

SUMMARY OF THE INVENTION

Accordingly, it is a general object of the present invention to overcome the disadvantages of the prior art.

Therefore, it is a primary objective of the invention to provide an EAS tag that is more difficult to defeat.

It is another objective of the invention to provide a cost-efficient EAS tag.

It is another objective of the invention to provide an EAS tag that is durable.

It is yet another objective of the invention to provide an EAS tag that does not have an arcuate channel that may be used to guide an unauthorized detaching probe to the attaching member.

It is a further objective of the invention to provide an EAS tag that is detachable when used with an authorized detaching unit.

In keeping with the principles of the present invention, a unique EAS tag is disclosed wherein no channel is defined therein that will guide an unauthorized probe to the attaching member. The interior of the tag further has numerous partitions and pillars that will prevent insertion of the unauthorized probe if inserted in the wrong plane. In addition, the EAS tag will deflect the unauthorized probe into false paths.

The EAS tag of the instant invention also discloses a metal clip that has an attaching region for receiving a shaft of a pin securely therein. The pin is removable when an authorized detacher is used to insert a probe into an opening within the EAS tag, and as a result of the secure fit of the tag within the detacher's nesting portion, the probe guides itself to the attaching member and applies a force thereto. The clip is slideably mounted onto at least one track that causes the clip to travel in a linear motion and causing the attaching region to release a shaft of the pin.

Furthermore, an apex region of the EAS tag that encloses the attaching member has a honeycombed shape such that unauthorized probes cannot be inserted into holes created above the attaching member to manipulate the same.

Such stated objects and advantages of the invention are only examples and should not be construed as limiting the present invention. These and other objects, features, aspects, and advantages of the invention herein will become more apparent from the following detailed description of the embodiments of the invention when taken in conjunction with the accompanying drawings and the claims that follow.

BRIEF DESCRIPTION OF THE DRAWINGS

It is to be understood that the drawings are to be used for the purposes of illustration only and not as a definition of the limits of the invention. In the drawings, wherein similar reference characters denote similar elements throughout the several views.

DETAILED DESCRIPTION OF THE INVENTION

Figure 2:
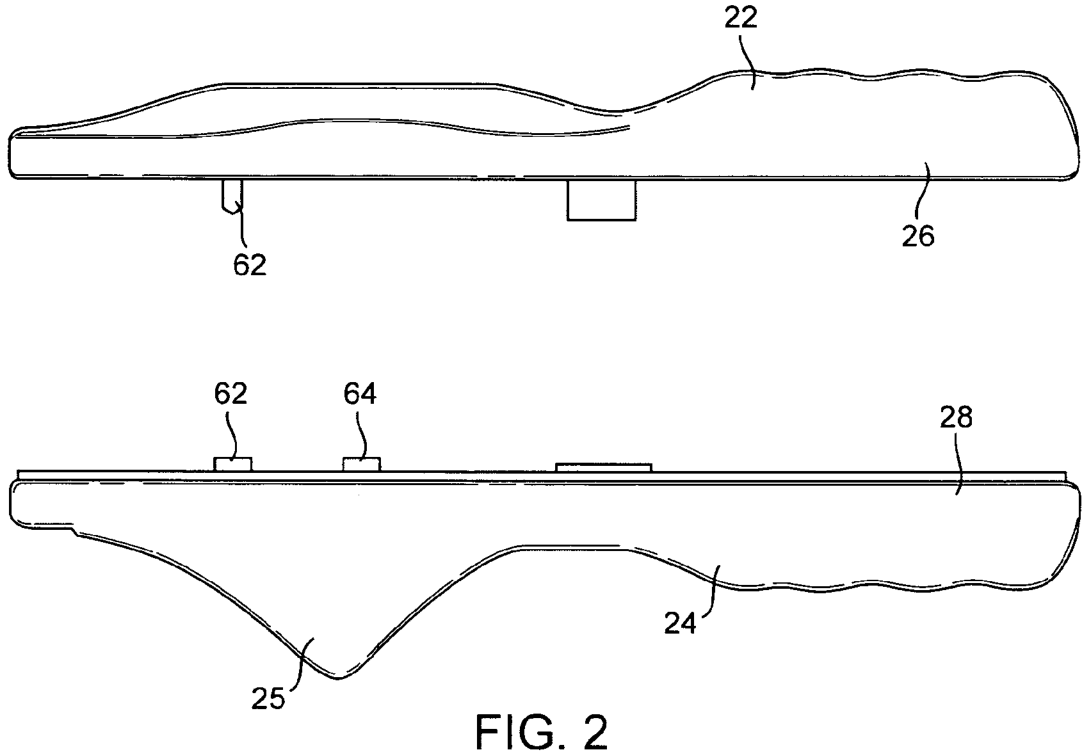
FIG. 2 is a side elevational view of the tag of the instant invention in an unassembled state.
Figure 1:
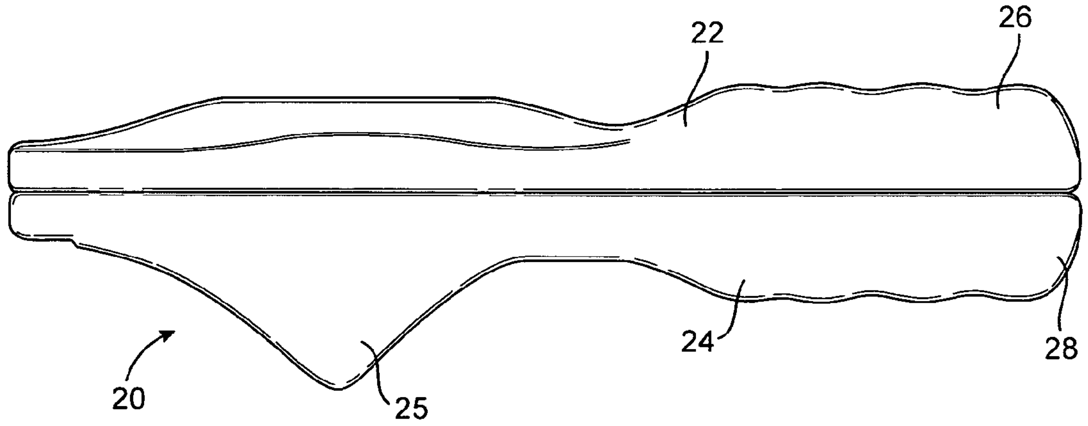
FIG. 1 is a side elevational view of the tag of the instant invention in an assembled state.
Figure 3:
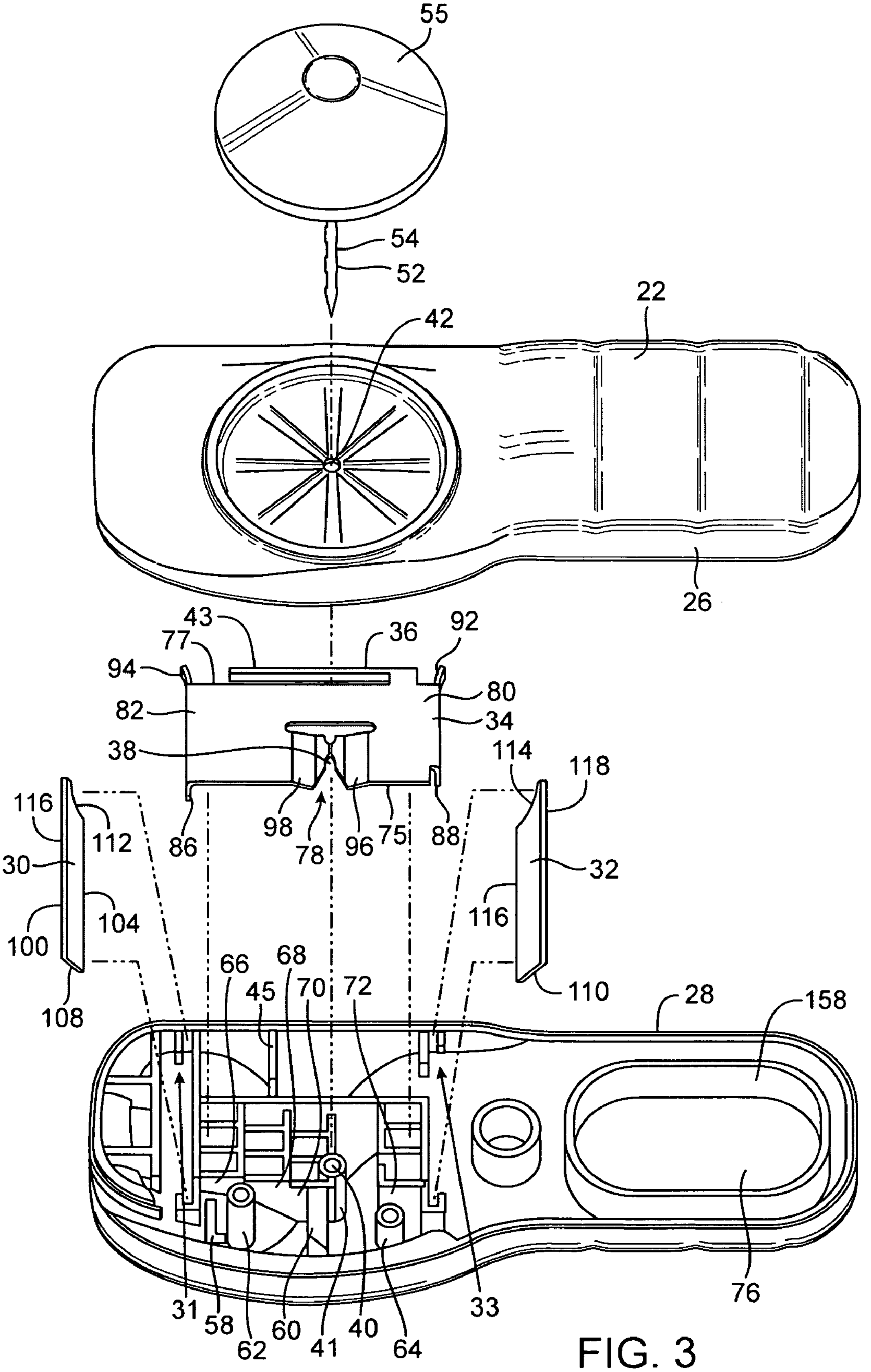
FIG. 3 is a perspective exploded view of the tag of the instant invention and the components thereof.
Figure 4:
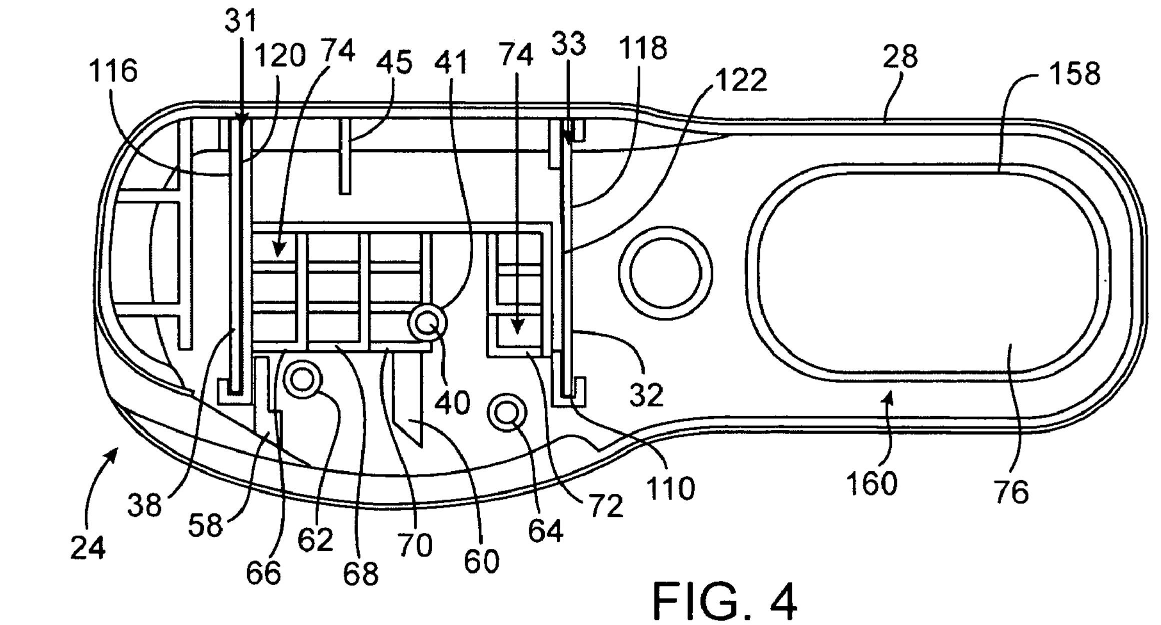
FIG. 4 is a top plan view of the interior of second half of the instant tag with the tracks installed.

Referring now to FIGS. 1 and 2, a tag 20 is illustrated having a first half 22 and a second half 24. First and second halves 22 and 24 are preferably made of a hard or rigid material. A usable rigid or hard material might be a hard plastic such as, for purposes of illustration but not limitation, an injection molded ABS plastic. If a plastic material is used, the mating of a first side wall 26 to a second side wall 28 can accomplished via an ultrasonic weld or like joining mechanism. However, it is to be understood that other joining methods, such as adhesives, may also be used. When first half 22 and second half 24 are securely joined, first sidewall 26 and second sidewall 28 form a peripheral outer wall of tag 20. Second half 24 has an apex region 25 that extends therefrom in an opposing direction to first half 22.

Now referring to FIG. 3, 4, 5, 11, and 11A, an exploded perspective view, top plan view, and perspective views illustrate the interior of second half 24. Second half 24 receives at least a first track 30 therein, and in a preferred embodiment it also receives a second track 32. First track 30 is tightly received within at least a first slot 31 and second track 32 is received tightly within at least a second slot 33, such that tracks 30 and 32 are maintained in substantially parallel relations. Tracks 30 and 32 are made of a hard material such as, but not limited to, metal, which enhances the durability and performance of the tag 20.

Figure 7:
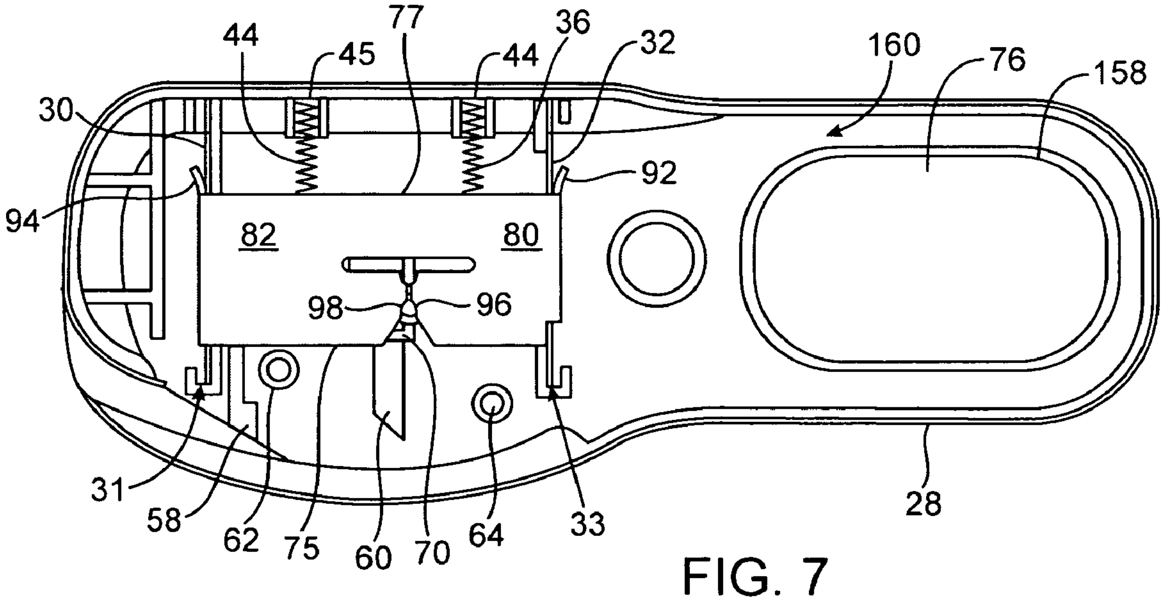
FIG. 7 is a top plan view of the interior of second half of the instant tag illustrating an alternate preferred embodiment for accommodating an alternate resilient member that attaches to first half illustrated in FIG. 6.
Figure 9:
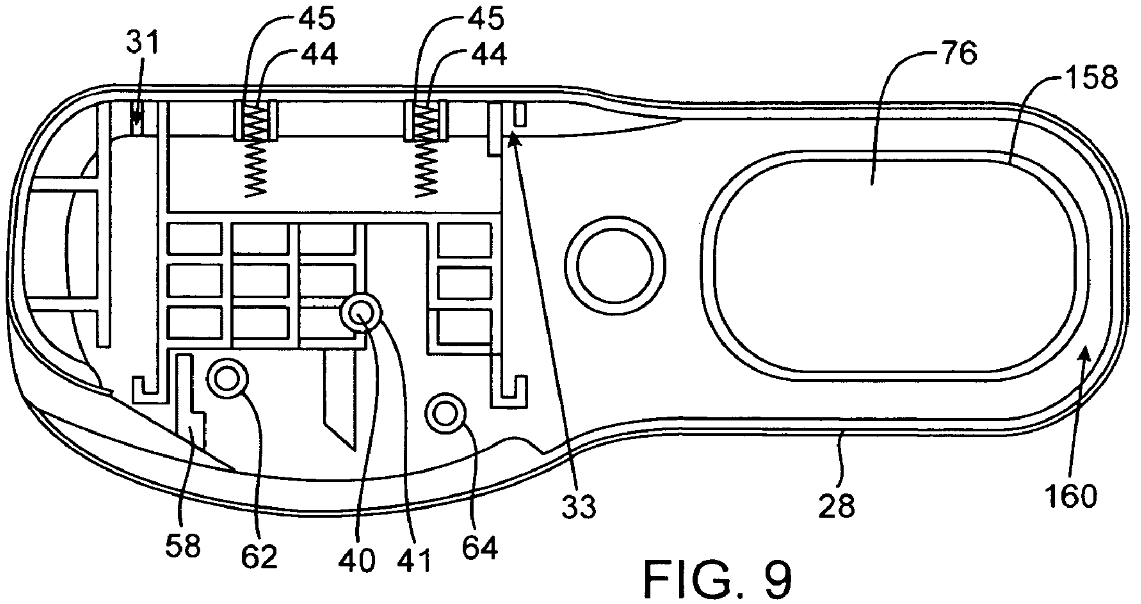
FIG. 9 is a top plan view of the interior of second half of the instant tag with the attaching member installed illustrating an alternate preferred embodiment for accommodating an alternate resilient member that attaches to first half illustrated in FIG. 8.

An attaching member 34, as described in greater detail hereinafter, slideably rests on at least first track 30, but in a preferred embodiment, rests on both first and second tracks 30 and 32. Attaching member 34 has a resilient member 36 that normally maintains an opening 38 defined on said attaching member 34 in axial alignment with an aperture 40 defined on the inside of second half 24 and a hole 42 defined on the interior of first half 22. In one preferred embodiment, attaching member 34 is made of spring sheet metal. Resilient member 36 may be a resilient lever arm 43 and in an alternate preferred embodiment, as illustrated in FIGS. 7 and 9, at least one spring 44 may be substituted for the resilient lever arm 43. Resilient member 36 is maintained in proximal relations to a barrier 45, such that attaching member 34 is maintained in axial alignment described above.

Figure 6:
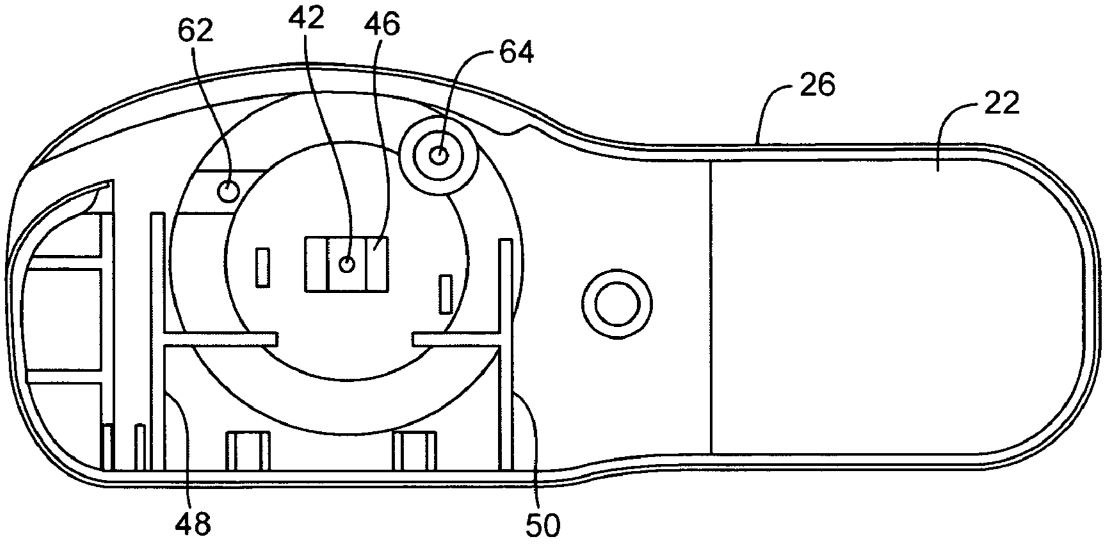
FIG. 6 is a top plan view of the interior of first half of the instant tag illustrating an alternate preferred embodiment for accommodating an alternate resilient member.
Figure 8:
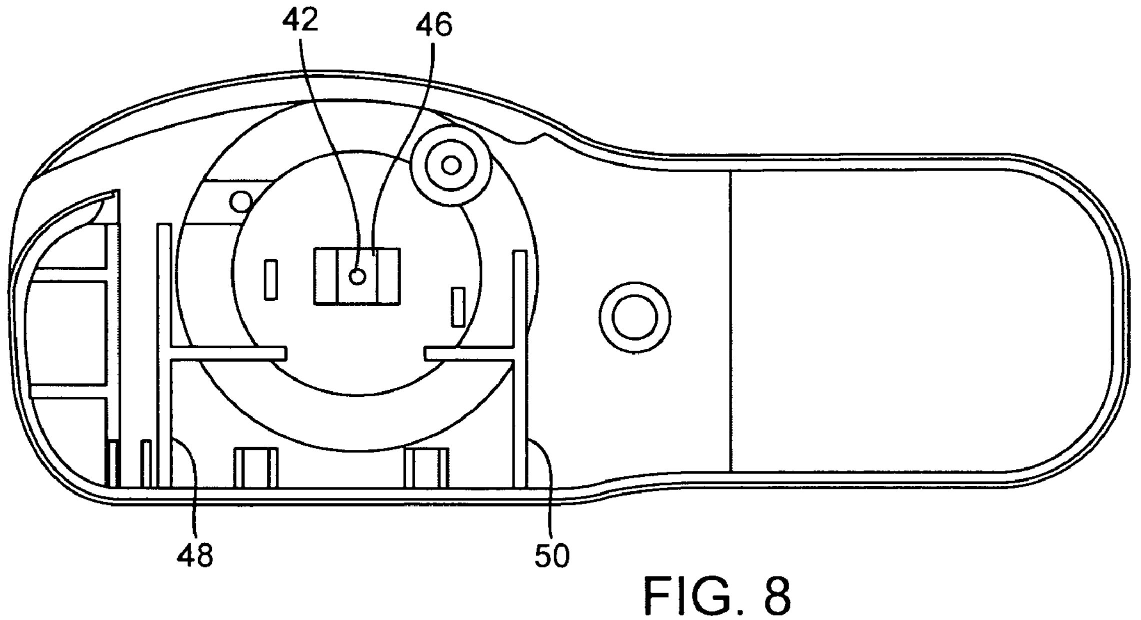
FIG. 8 is a top plan view of the interior of first half of the instant tag illustrating an alternate preferred embodiment for accommodating an alternate resilient member.
Figure 10:
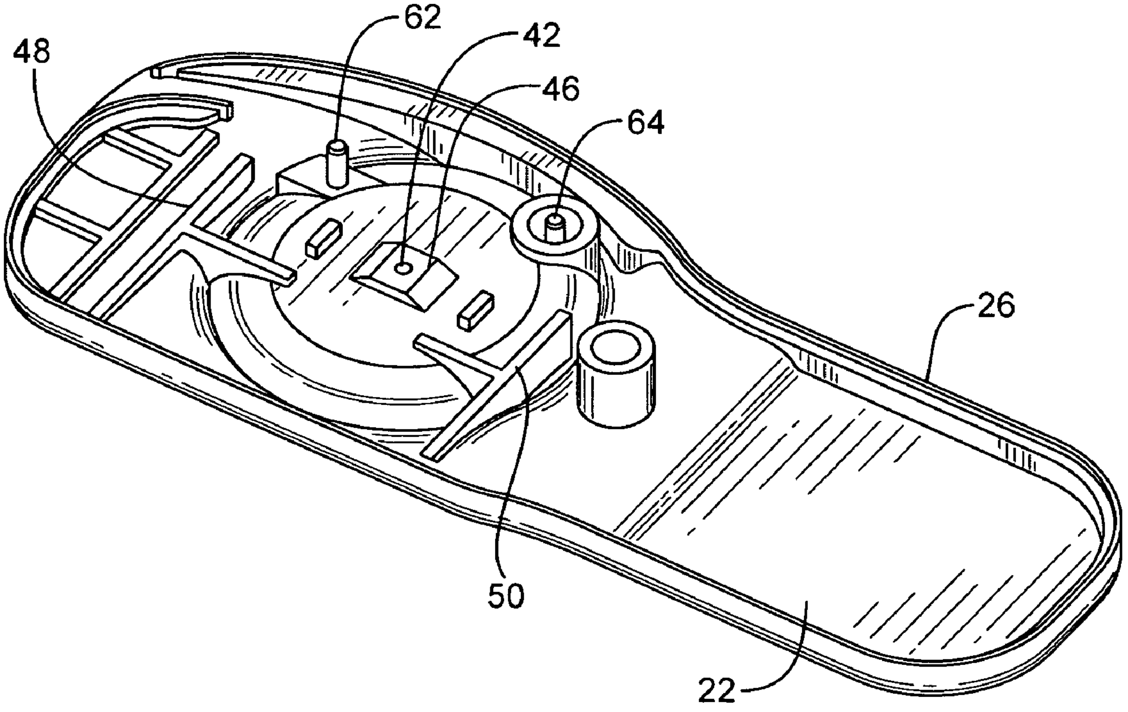
FIG. 10 is a perspective view of the interior of first half of the instant invention.

Now referring to FIGS. 6, 8, and 10, the interior of first half 22 is illustrated having a reinforcement means 46 defining opening 42. Reinforcement means 46 extends inwardly but does not interfere with the sliding action of attaching member 34 on first and second tracks 30 and 32. At least a first ridge 48 extends inwardly from the interior of first half 22 and is in proximal relation to first track 30. In a preferred embodiment, a second ridge 50 also extends inwardly from the interior of first half 22 and is in proximal relation to second track 32. Ridges 48 and 50 prevent upward movement of attaching member 34, yet do not interfere with the sliding arrangement of attaching member 34 over first and second tracks 30 and 32. Ridges 48 and 50 are in substantially parallel relations to one another.

Figure 11:
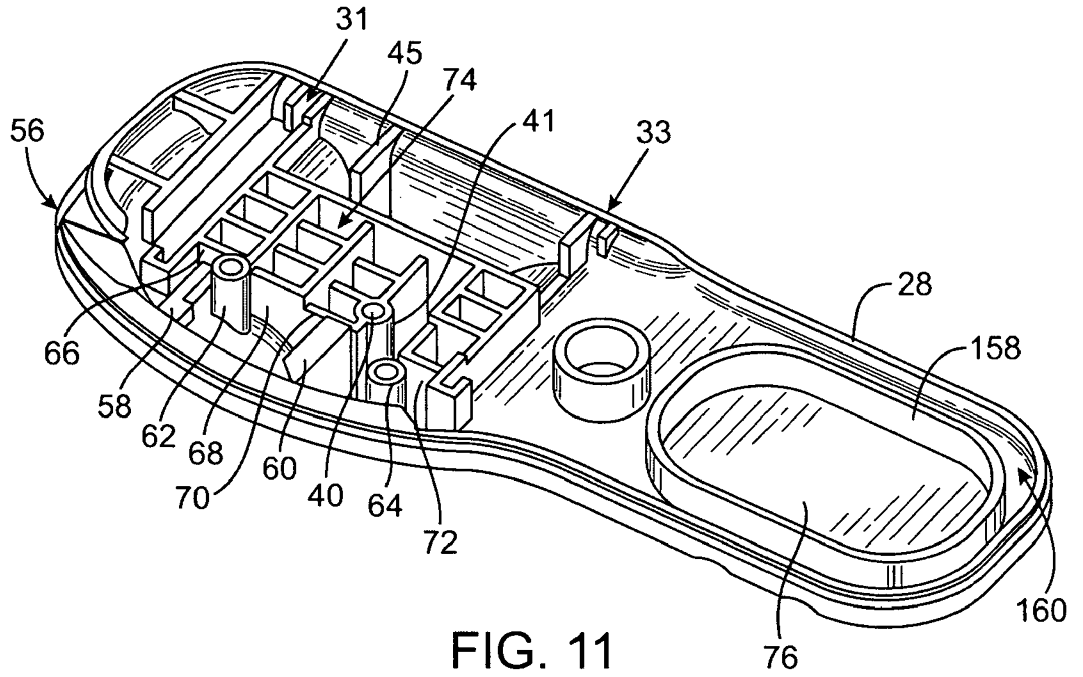
FIG. 11 is a perspective view of the interior of second half of the instant invention without the components therein.
Figure 11A:
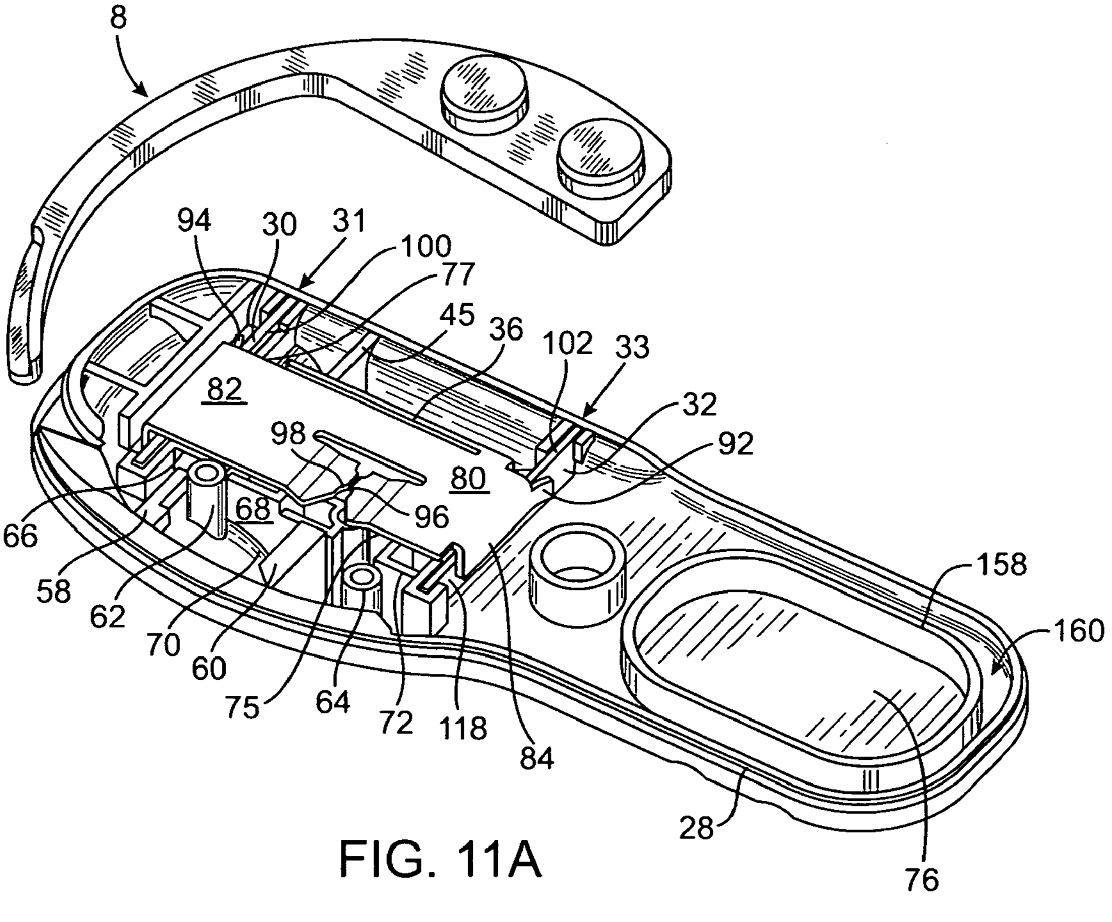
FIG. 11A is a perspective view of the interior of second half of the instant invention with the tracks and attaching member installed.
Figure 12:
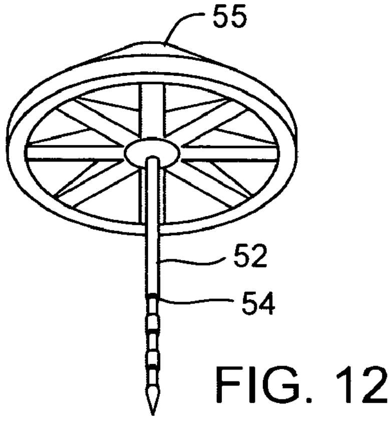
FIG. 12 is a perspective view of a pin used with the instant invention.

Now referring to FIG. 12 and FIGS. 11 and 11A again in particular, in addition to the previous FIGS, a plurality of devices have been provided to prevent unauthorized manipulation and disengagement of attaching member 34. When first half 22 and second half 24 are assembled, a shaft 52, having a plurality of indentations 54 at predetermined intervals along the length thereof, is inserted through hole 42 and is received securely yet removably within opening 38 of attaching member 34. Shaft 52 further extends into aperture 40, which is defined by a tubular formation 41 extending inwardly from second half 24. A top 55 is securely maintained at one end of shaft 52, such that an opposing end of shaft 52 traverses an article to be monitored and is maintained within opening 38 of attaching member 34 and aperture 40, whereby the article is securely bound between top 55 and outer surface of tag 20.

Figure 12A:
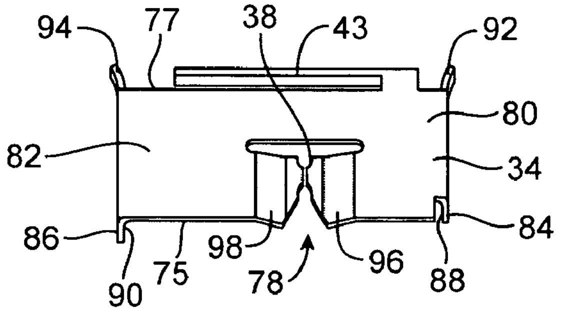
FIG. 12A is a frontal perspective view of the attaching member of the instant invention.
Figure 12B:
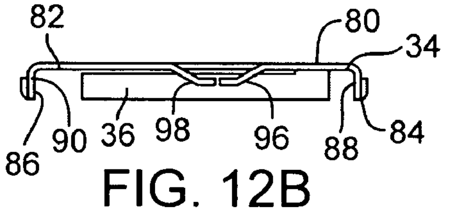
FIG. 12B is a front elevational view of the attaching member of the instant invention.
Figure 12C:
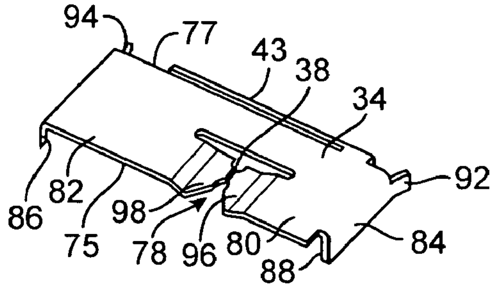
FIG. 12C is a side perspective view of the attaching member of the instant invention.

Now also referring to FIGS. 12A, 12B, and 12C, attaching member 34 has a forward edge 75 and a distal rearward edge 77. An attaching region 78 is defined proximal to the forward edge 75 and resilient member 36 is located proximal to rearward edge 77. A first region 80 and a second region 82 are divided by attaching region 78. A first lip 84 extends downwardly from first region 80 and a second lip 86 extends downwardly from second region 82, such that first lip 84 and second lip 86 are in substantially parallel relations to one another, and each of the lips 84 and 86 are in substantially perpendicular relation to first and second regions 80 and 82 respectively. A first interior wall 88 and a second interior wall 90 are created by lips 84 and 86 respectively. First lip 84 and second lip 86 extend beyond rearward edge 77 and form a first outward curve 92 and a second outward curve 94 respectively, on a side of attaching member 34 proximal to resilient member 36. Opening 38 of attaching member 34 is defined by a first jaw 96 and an opposing second jaw 98. Jaws 96 and 98 extend downwardly from the plane of first and second regions 80 and 82 and are in proximal relations when they define opening 38. However, jaws 96 and 98 are flexible such that they can move towards one another to decrease the size of opening 38 or they can move away from one another to increase the size of opening 38. As a result, shaft 52 is maintained within opening 38 as defined by jaws 96 and 98 in a secure, yet removable, manner.

Figure 12D:
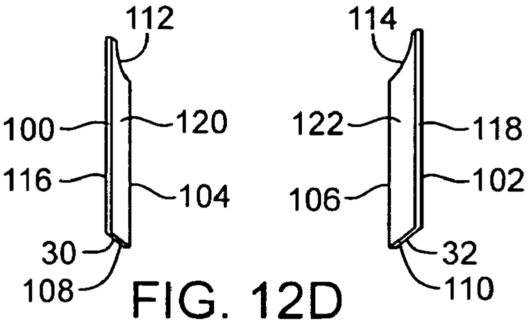
FIG. 12D is a top perspective view of the first and second tracks used in the instant invention.

Now also referring to FIG. 12D, first track 30 has a first top edge 100 and a first bottom edge 104 which are distal to one another and are interconnected by a first front edge 108 and an opposing first back edge 112. Second track 30 has a second top edge 102 and a second bottom edge 106 which are distal to one another and are interconnected by a second front edge 110 and an opposing second back edge 114. First back edge 112 and second back edge 114 are curved to accommodate the curved portion of second side wall 28 where apex 25 is created. First track 30 has a first outer surface 116 and a first inner surface 120 and second track 32 has a second outer surface 118 and a second inner surface 122.

In order to disengage shaft 52 from jaws 96 and 98, enough force must be applied to forward edge 75 of attaching member 34 to overcome the force exerted by the resilient member 36, and to move attaching member 34 towards rearward edge 75. In addition, the force must be sufficient to overcome the frictional force created between first interior wall 88 and second outer surface 118 and the frictional force created between second interior wall 90 and first outer surface 116. In order to do so, a probe of a predetermined shape and length must be inserted through entrance 56 of tag 20 and extend to attaching member 34 to apply the sufficient necessary force to forward edge 75 to overcome the force exerted by the resilient member 36 and the frictional force described above to allow sufficient linear movement along first and second tracks 30 and 32 to disengage and remove shaft 52 from first and second jaws 96 and 98. U.S. Pat. No. 4,738,258 is hereby incorporated by reference for teaching the probe required and the necessary actuation thereof for insertion into entrance 56. U.S. Pat. No. 4,738,258 can be modified into the disengagement apparatus illustrated in U.S. Pat. No. 5,426,419 and U.S. Pat. No. 5,535,606, the teachings of the detacher are also incorporated herein by reference.

To determine the force required to disengage the shaft 52 from jaws 96 and 98 of attaching member 34 of the instant invention as compared to the tag of the '419 patent, the following experiment was conducted on ten tags 10 of the instant invention and ten tags produced in accordance with the specification of the '419 patent. A spring balance was hung on a wall, with its spring loading hook at the bottom. Two ends of a cotton sling were tied to form a loop. One end of the loop was secured on the hook of the balance whereas the other end was wound through the handle such that a downward pull force on the detacher (as illustrated in FIGS. 11 and 12 of the '419 patent) led to the squeezing of the detacher's trigger. Because the spring balance is in series with the sling, a measure of the triggering force to detach the tack shaft 52 could be measured. On average, approximately five pounds more force was required to detach the shaft 52 from the attaching member 34 of the instant invention than the tag of the '419 patent.

Figure 5:
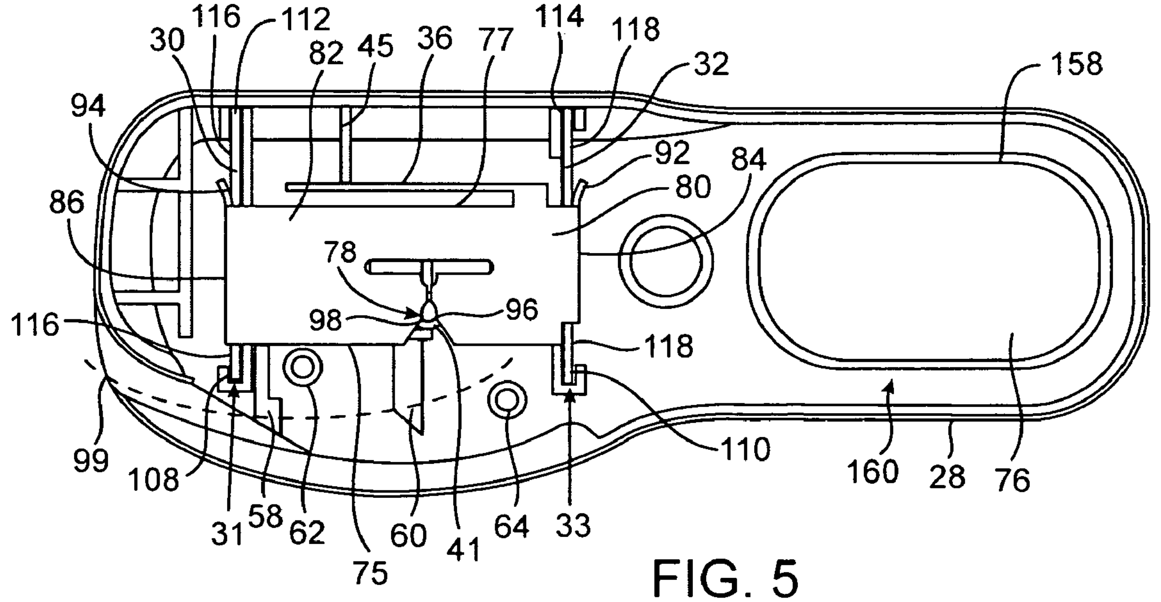
FIG. 5 is a top plan view of the interior of second half of the instant tag with the tracks and the attaching member installed.

In order to defeat the introduction of unauthorized probes into entrance 56, several false paths and barriers are provided within tag 20 and the arcuate channel of the '419 patent and the '390 patent are completely eliminated. Because apex region 25 of tag 20 is constructed to be securely retained within a nesting or cradle area of a detacher, as taught by the '419 patent, tag 20 does not require any arcuate channels to lead the detaching probe to the forward edge 75 of the attaching member 34. The predetermined shape of the detaching probe and the predetermined positioning of the attaching member 34 allow an authorized individual using an authorized detacher to disengage the shaft 52 from jaws 96 and 98, thereby releasing the attached article. Dashed line 99, of FIG. 5, illustrates a proper path that may be taken by the detaching probe.

However, to defeat even the introduction of a probe that has been illicitly disassembled from an authorized detacher, a first partition 58 prevents entrance of the unauthorized probe if at an incorrect plane. A second partition 60 having a greater height than first partition 58, also prevents the introduction of an unauthorized probe to attaching member 34. A first pillar 62 and a second pillar 64 also prevent application of force to attaching member 34 by an unauthorized probe by deflecting the same. A third partition 66, a fourth partition 68, a fifth partition 70, and sixth partition 72 are at different levels and define a plurality of cavities 74 therebetween. Cavities 74 extend within apex region 25 and are substantially perpendicular to the plane of attaching member 34, such that an unauthorized probe inserted through apex region 25 will be retained within a single cavity 74 and will not be able to manipulate attaching member 34 laterally to disengage shaft 52.

Figure 13:
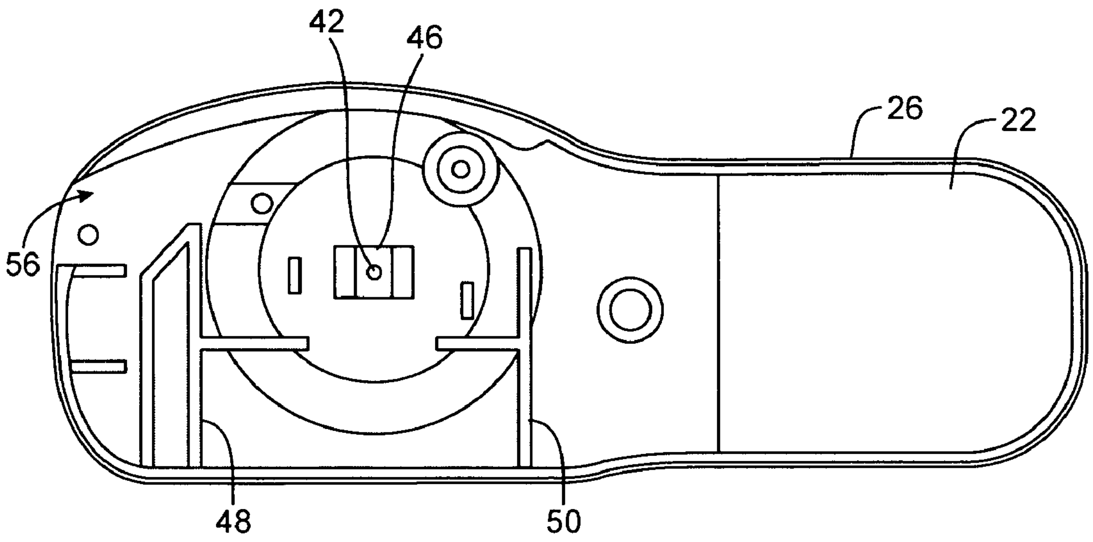
FIG. 13 is a top plan view of the interior of the first half of an alternate preferred embodiment of the instant invention illustrating additional pillars and walls that may be placed within the tag to thwart an unauthorized probe insertion.
Figure 13A:
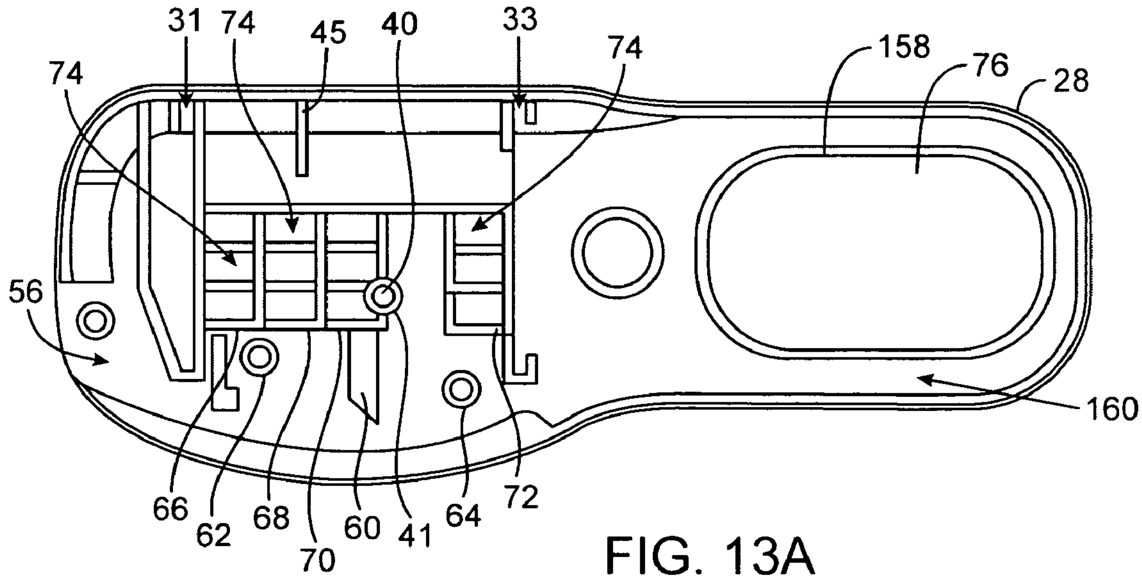
FIG. 13A is a top plan view of the interior of the second half of an alternate preferred embodiment of the instant invention illustrating additional pillars and walls that may be placed within the tag to thwart an unauthorized probe insertion that attaches to first half illustrated in FIG. 13.
Figure 14:
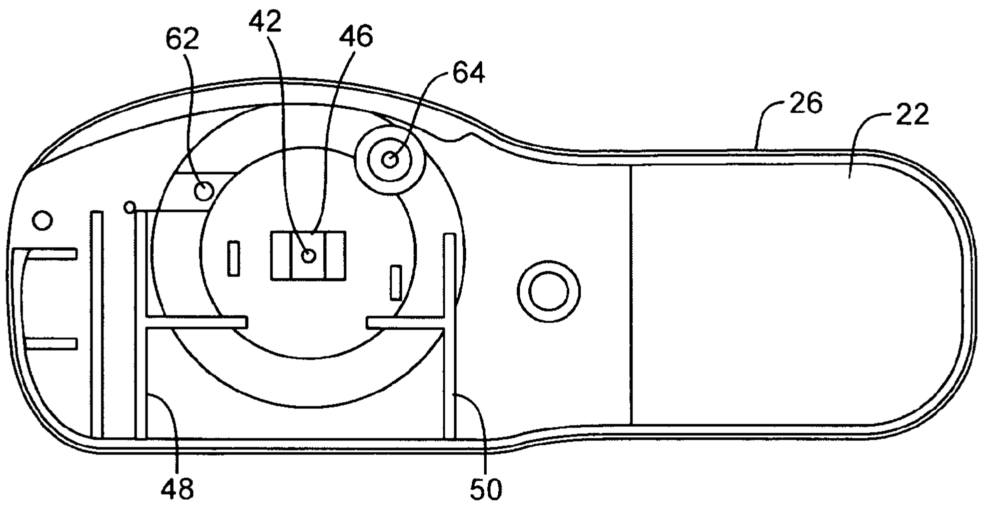
FIG. 14 is a top plan view of the interior of the first half of an alternate preferred embodiment of the instant invention illustrating additional pillars that may be placed within the tag to thwart an unauthorized probe insertion.
Figure 14A:
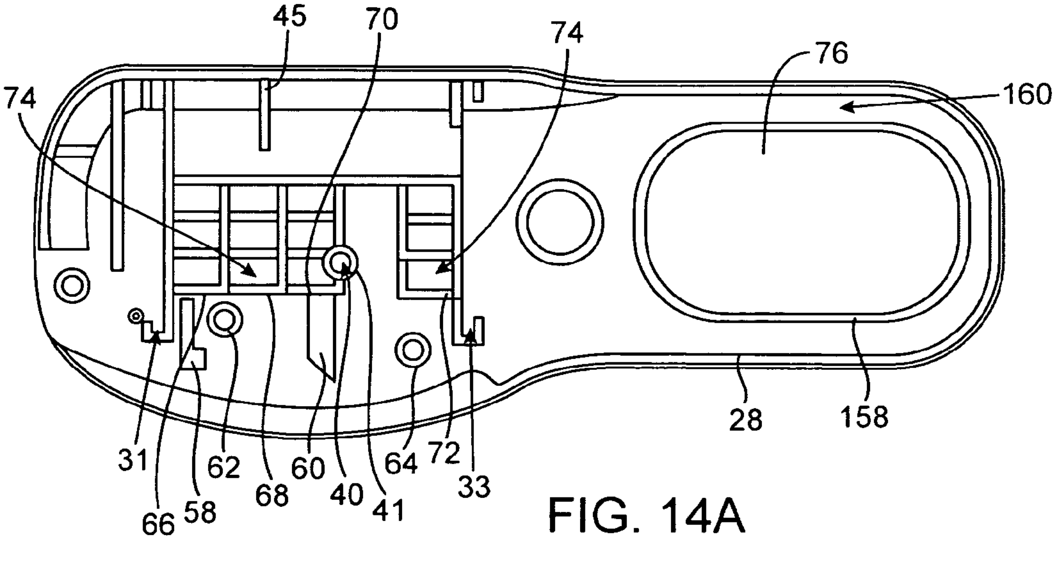
FIG. 14A is a top plan view of the interior of the second half of an alternate preferred embodiment of the instant invention illustrating additional pillars that may be placed within the tag to thwart an unauthorized probe insertion and attaches to the first half illustrated in FIG. 14.

Furthermore, if an unauthorized probe is being manipulated by hand, the probe will not be inserted at the correct plane to make proper contact with forward edge 75 of attaching member 34 to disengage the same. Instead, the unauthorized probe will go into the space defined between attaching member 34 and the different partitions 66, 68, 70, and 72. FIG. 13 and 13A teach an alternate preferred embodiment with different barriers to prevent access to the attaching member 34 of tag 20. FIG. 14 and 14A teach an alternate preferred embodiment with further different barrier arrangements to prevent access to the attaching member 34 of tag 20.

Figure 15:
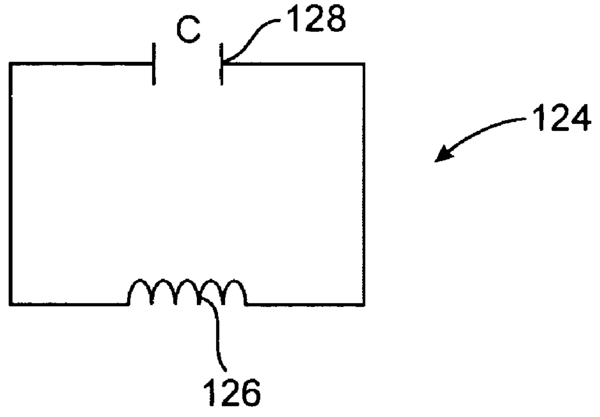
FIG. 15 is an electrical schematic diagram of the resonant tag circuit.

Referring now also to FIG. 15, therein is illustrated a schematic diagram of a resonant tag circuit 124. In a preferred embodiment, circuit 124 has at least an inductive element 126 and at least a capacitance element 128 connected in a series loop and forming an inductive capacitance (LC) resonant circuit 124. The resonant tag circuit is employed in connection with electronic article security systems particularly electronic article security systems of the radio frequency or RF electromagnetic field type. Such electronic article security systems are well known in the art and a complete detailed description of the structure and operation of such electronic article security systems is consequently not necessary for an understanding of the present invention.

Figure 17:
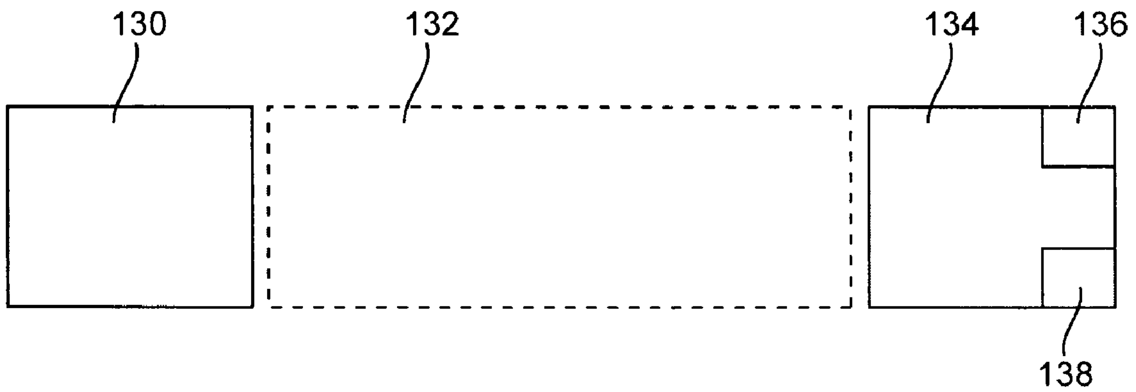
FIG. 17 is a block diagram of an article surveillance system incorporating the resonant tag circuit.

However, as illustrated in FIG. 17, such electronic article security systems employing resonant tag circuits include a transmitting means 130 for transmitting electromagnetic energy at or near the resonant frequency of the resonant tag into or through a surveillance zone 132. A detecting means 134 monitors the surveillance zone 132 for the presence of a resonant tag within the surveillance zone 132. Surveillance zone 132 is generally proximate to an entrance and/or exit of a facility such as, but not limited to, a retail store. The security system's function is to detect the presence within the surveillance zone 132 a monitored article having a resonant tag circuit 124 attached thereto in a secure fashion.

In such a system, transmitting means 130 transmits pulses in the form of RF bursts at a frequency in the low radio-frequency range, such as 58 kHz in a preferred embodiment but may be adapted to be at any appropriate frequency as desired. The pulses (bursts) are emitted (transmitted) at a repetition rate of, for example 60 Hz AC cycle, with a pause between successive pulses. The detecting means 134 includes a receiver 136 which is synchronized (gated) with the transmitting means 130 so that it is activated only during the pauses between the pulses emitted by the transmitting means 130. The receiver 136 expects to detect nothing in these pauses between the pulses. If an activated tag is present within the surveillance zone 132, however, the resonator therein is excited by the transmitted pulses, and will be caused to oscillate at the transmitter frequency, i.e., at 58 kHz in the above example. The resonator emits a signal which rings at the resonator frequency, with an exponential decay time ("ring-down time"). The signal emitted by the activated tag, if it is present between transmitting means 130 and the receiver 136, is detected by the receiver 136 in the pauses between the transmitted pulses and the receiver accordingly triggers an alarm 138. Alarm 138 may be audible and/or visual or can be a silent alarm that is detected by any means known in the art.

In a preferred embodiment, to minimize false alarms, the detecting means 134 usually must detect a signal in at least two, and preferably four, successive pauses; however, it is to be understood that the present invention can be adapted to function within one pause. Furthermore, in order to further minimize false alarms, such as due to signals produced by other RF sources, the receiver 136 employs two detection windows within each pause. The receiver 136 integrates any 58 kHz signal (in this example) which is present in each window, and compares the integration results of the respective signals integrated in the windows. Since the signal produced by the tag is a decaying signal, if the detected signal originates from a resonator in a tag it will exhibit decreasing amplitude (integration result) in the windows. By contrast, an RF signal from another RF source, which may coincidentally be at, or have harmonics at, the predetermined resonant frequency, would be expected to exhibit substantially the same amplitude (integration result) in each window. Therefore, alarm 138 is triggered only if the signal detected in both windows in a pause exhibits the aforementioned decreasing amplitude characteristic in each of a number of successive pauses.

For this purpose, as noted above, the receiver electronics is synchronized by a synchronization circuit with the transmitter electronics. The receiver electronics is activated by the synchronization circuit to look for the presence of a signal at the predetermined resonant frequency in a first activation window of about 1.7 ms after the end of each transmitted pulse. For reliably distinguishing the signal (if it originated from the resonator) integrated within this first window from the signal integrated in the second window, a high signal amplitude is desirable in the first window. Subsequently, the receiver electronics is deactivated, and is then re-activated in a second detection window at approximately 6 ms after the original resonator excitation, in order to again look for and integrate a signal at the predetermined resonant frequency. If such a signal is integrated with approximately the same result as in the first detection window, the evaluation electronics assumes that the signal detected in the first window did not originate from a marker, but instead originated from noise or some other external RF source, and alarm 138 therefore is not triggered.

Figure 16:
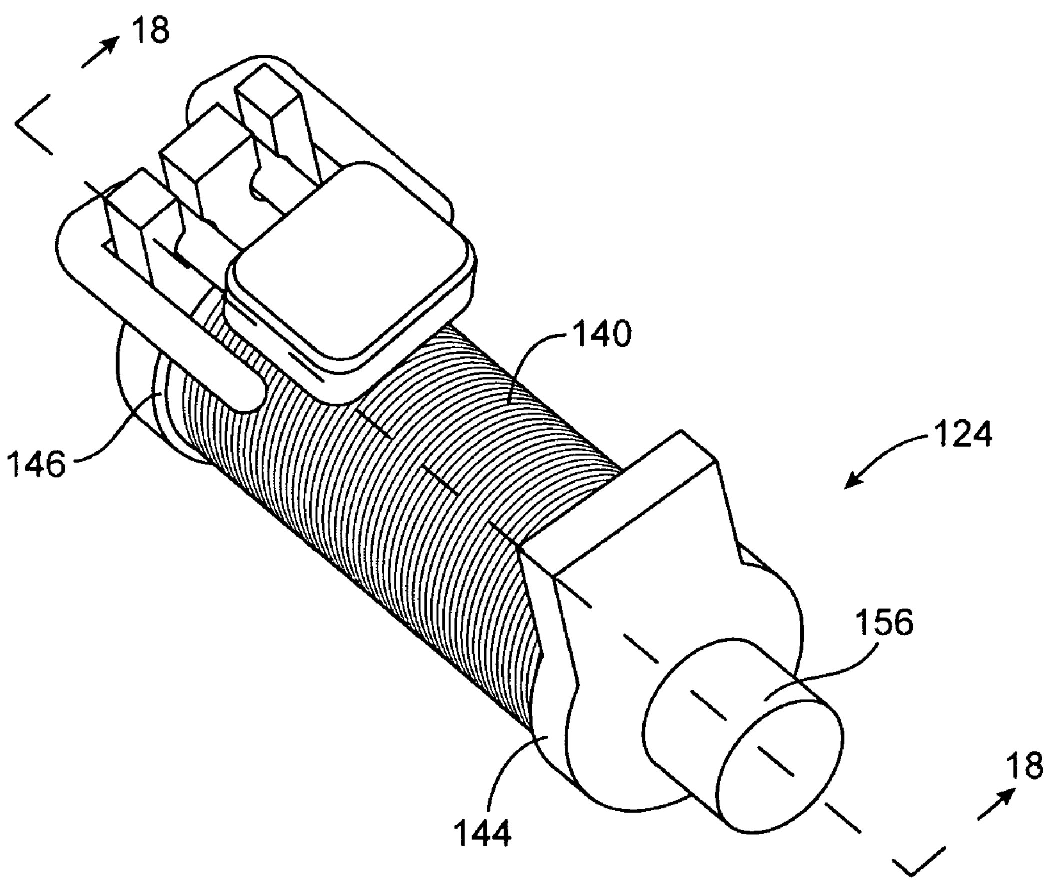
FIG. 16 is a perspective view of the resonant tag circuit.
Figure 18:
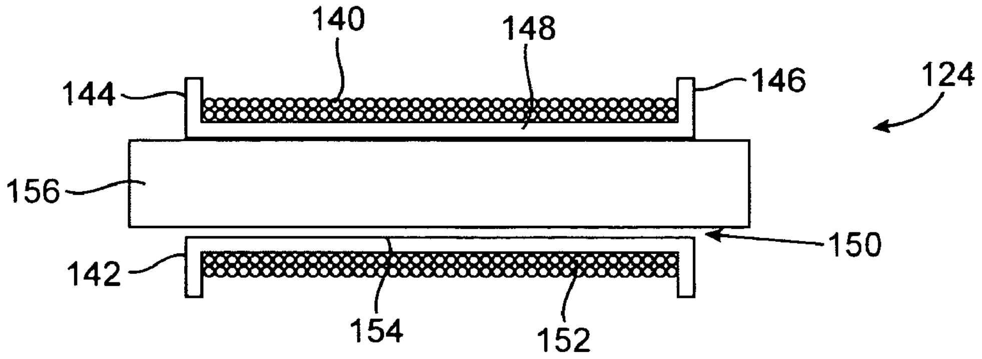
FIG. 18 is a cross-sectional view of a resonant tag system taken along line 18-18 of FIG. 16.

Now also referring to FIGS. 16 and 18, therein is illustrated a preferred embodiment of the resonant tag circuit 124. Inductive element 126 is formed by a conducting member 140 that is made of any material that is capable of conducting electricity, and in a preferred embodiment is made of copper. Conducting member 140 is coiled around a first member 142 that is preferably constructed of a non-conductive material such as, but not limited to, plastic and rubber. First member 142 has a first wall 144 and a second wall 146 that are interconnected by a middle portion 148. First wall 144, second wall 146, and middle portion 148 axially define a cavity 150 extending therethrough.

Middle portion 148 is adapted to receive conducting member 140 thereon in a coiled fashion on an outer surface 152 thereof between first wall 144 and second wall 146. Middle portion 148 has an inner surface 154 that defines cavity 150. A magnetic member 156 is adapted to be received within cavity 150 and to be frictionally retained within inner surface 154 of middle portion 148. Magnetic member 156 may be a ferromagnetic material or any other material having magnetic properties, and in a preferred embodiment, magnetic member 156 is made of amorphous metals.

Capacitance element 128 is a parallel plate capacitor formed of conductive material on a first plate and a second plate (not shown) that are known in the art. Capacitance element 128 is adapted to be received on first member 142, and in a preferred embodiment is received on first wall 144 thereof. First plate and second plate of capacitance element 128 are attached to opposing ends of conducting member 140 to form a series circuit.

When resonant tag circuit 124 enters a surveillance zone 132 it is subjected to an electromagnetic field and magnetic member 156 is charged. As the electromagnetic field is removed, the stored magnetic energy stored in the magnetic member 156 is released and thus an ac current is generated within inductive element 126 and capacitance element 128. When an ac voltage is applied to the resonant tag circuit 124, the current depends on the frequency thereof. The resonant frequency of circuit 124 can be determined by the following equation:

$$fo = \frac{1}{2\pi\sqrt{LC}}$$

Wherein $f_o$ is the resonant frequency of the circuit and L is the inductance and C is the capacitance. As can be ascertained from the equation, many possible combinations yield the desired resonant frequency, however, the L to C ratio is preferably kept high in order for the circuit to be selective and minimize undesirable resonances to disturbances close to the resonant frequency thus minimizing false alarms. In a preferred embodiment, optimal values were determined to be L=2.08 mH and C=3.6 nF thus yielding an L to C ratio of 577,777.78.

It is to be understood that resonant tag circuit 124 is of sufficient size to be stored within casings used in article surveillance systems. Specifically, tag circuit 124 is of sufficient size to be received and enclosed within compartment 76 of tag 20. Compartment 76 is defined by a peripheral wall 158 extending inwardly from second half 24 to enclose the resonant tag circuit 124 therein. A false path 160 is created between second side wall 28 and peripheral wall 158.

If an article having resonant tag circuit 124 attached thereto via tag 20 is moved into the surveillance zone 132, the alarm 138 will be activated by circuit 124 to signify unauthorized removal of the article through a specified area. For purposes of illustration but not limitation, in a preferred embodiment, the length of circuit 124 is less than 2 cm and the radius thereof is less than 1 cm. However, it is to be understood that alternate sizes and shapes of circuit 124 will also function as taught and alternate electronic detection circuits as are known in the art may also be used.

While the above description contains many specificities, these should not be construed as limitations on the scope of the invention, but rather as an exemplification of one preferred embodiment thereof. Many other variations are possible without departing from the essential spirit of this invention. Accordingly, the scope of the invention should be determined not by the embodiment illustrated, but by the appended claims and their legal equivalents.

What is claimed is:

1. A device for monitoring items through electronic article surveillance (EAS), comprising:

a tag body;

an attaching member located within said tag body;

a shaft having a top, wherein said shaft is inserted through an item to be monitored until said top engages said item, and said shaft entering said tag body through a hole and being received securely by said attaching member;

a detectable EAS sensor within said tag body;

a probe of a predetermined shape and path is inserted through an entrance within said tag body and engages said attaching member and allows extraction of said shaft by moving said attaching member in a substantially linear manner.

2. The device of claim 1, wherein said attaching member is slideably received on at least a first track located on an interior of said tag body;

whereby, application of force to attaching member by said probe forces attaching member to travel in a linear manner on said first track and releases said shaft.

3. The device of claim 2, wherein said attaching member further comprises a first lip and a second lip extending from opposing ends of attaching member in substantially parallel relations and extending over said first track.

4. The device of claim 2, wherein said tag body further comprises a second track 32 located on the interior of said tag body and extends in a substantially parallel relation to said first track;

whereby, said attaching member travels in a slideable and linear manner.

5. The device of claim 4, wherein said attaching member further comprises a first lip and a second lip extending from opposing ends of said attaching member in substantially parallel relations;

said first lip extending over said first track and said second lip extending over said second track, whereby said attaching member is slideably maintained thereon and travels in a linear manner along said first track and said second track.

6. A device for monitoring items through electronic article surveillance (EAS), comprising:

a tag body having a first half and a second half that are joined around a perimeter of said tag body by a first side wall and a second side wall extending inwardly from said first and second halves respectively;

an entrance being defined through said first side wall and said second side wall at a front region of said tag body;

a detectable EAS sensor enclosed within said tag body;

an attaching member 34 located between said first half and said second half;

a first track slideably receiving said attaching member thereon;

a shaft having a top, wherein said shaft is inserted through an item to be monitored until said top engages said item, and said shaft enters said tag body through a hole and is received securely by said attaching member;

a probe of a predetermined shape and path is inserted through an entrance within said tag body and imparts a sufficient force on said attaching member, whereby said attaching member travels along said first track in a linear manner and allows extraction of said shaft.

* * * * *